(12) United States Patent
Eguchi et al.

(10) Patent No.: US 8,272,003 B2
(45) Date of Patent: Sep. 18, 2012

(54) DISC APPARATUS

(75) Inventors: Takaharu Eguchi, Tokyo (JP);
Yoshifumi Awakura, Tokyo (JP);
Akihito Onishi, Tokyo (JP); Tatsunori Fujiwara, Tokyo (JP); Akinori Tsukaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 204 days.

(21) Appl. No.: 12/989,564

(22) PCT Filed: May 15, 2009

(86) PCT No.: PCT/JP2009/002153
§ 371 (c)(1),
(2), (4) Date: Oct. 25, 2010

(87) PCT Pub. No.: WO2010/013374
PCT Pub. Date: Feb. 4, 2010

(65) Prior Publication Data
US 2011/0202937 A1 Aug. 18, 2011

(30) Foreign Application Priority Data
Jul. 30, 2008 (JP) .................................. 2008-196445

(51) Int. Cl.
*G11B 17/03* (2006.01)
(52) U.S. Cl. ...................................................... 720/624
(58) Field of Classification Search .................. 720/624, 720/652, 648, 603, 649, 617, 655, 695, 601, 720/657, 620, 626, 653, 646, 634, 651, 615, 720/632, 619, 616, 606, 608
See application file for complete search history.

(56) References Cited

U.S. PATENT DOCUMENTS

| | | | |
|---|---|---|---|
| 6,747,937 B2 | 6/2004 | Kinoshita et al. | |
| 2007/0124746 A1* | 5/2007 | Shizuya et al. | 720/649 |
| 2009/0119692 A1* | 5/2009 | Fujimori et al. | 720/652 |

FOREIGN PATENT DOCUMENTS

| | | |
|---|---|---|
| JP | 2001-331998 A | 11/2001 |
| JP | 2002-329361 A | 11/2002 |
| JP | 2003-217207 A | 7/2003 |
| JP | 2004-55040 A | 2/2004 |
| JP | 2006-164455 A | 6/2006 |
| JP | 2007-323728 A | 12/2007 |

* cited by examiner

*Primary Examiner* — Allen Cao
(74) *Attorney, Agent, or Firm* — Birch, Stewart, Kolasch & Birch, LLP

(57) ABSTRACT

A disc apparatus includes: a playback unit 1 provided with a conveying roller 5 and a disc guide 3 to be vertically movable with respect to an apparatus main body; a moving means for moving downward the conveying roller and the disc guide in amounts of travel which are different from each other to avoid contact of the roller and the guide with a disc 14 with interlocking an operation that the loaded disc 14 is moved downward to be mounted on a turntable 6; and a disc-guide-cum-position-regulating member 102 attached to the apparatus main body corresponding to a disc loading port such that the playback unit is restrained from moving to the disc loading port side.

2 Claims, 10 Drawing Sheets

DISC APPARATUS

TECHNICAL FIELD

The present invention relates to a disc apparatus for loading and unloading a disc into and from an apparatus main body by the rotation of a conveying roller by pressing the disc against a disc guide with the conveying roller.

BACKGROUND ART

A conventional disc apparatus loads and unloads a disc into and from an apparatus main body by the rotation of a disc conveying roller by pressing the disc against a disc guide with the conveying roller. After the disc is carried to a predetermined position within the apparatus main body, the disc is separated from the disc guide to be placed on a turntable located on a playback unit, and also the conveying roller moves in the direction where the roller is greatly moved away from the disc to condition the disc for being played back. In the disc apparatus, the playback unit existing in a standby state awaiting the loading of a disc is fixed in vertical and horizontal directions to the apparatus main body, and is restrained from moving backward. However, since the disc is moved from a loading direction, it is not possible to restrain the playback unit from moving to the side where the disc is loaded.

Further, in disc apparatuses disclosed in Patent Documents 1 and 2, a holding member for holding a conveying roller for conveying a disc is abutted against an apparatus main body (chassis), thus restraining a playback unit from moving forward.

PRIOR ART DOCUMENTS

Patent Documents
  Patent Document 1: JP-A-2001-331998
  Patent Document 2: JP-A-2003-217207

SUMMARY OF THE INVENTION

In conventional disc apparatuses in which the playback unit existing in a standby position awaiting the loading of a disc is fixed in vertical and horizontal directions to the apparatus main body, a clearance can be reduced, and a disc can be prevented from positionally varying; however, the operating load for fixation increases. Further, the playback unit is not positionally stable in a fore-and-aft direction of the unit, and the amount of unloading of a disc and the loading start position cannot be held constant. Thus, it is necessary to place some type of restriction thereon.

However, as shown in Patent Documents 1 and 2, in the arrangement where the playback unit is restrained from forward moving by abutting a conveying-roller-holding member against the apparatus main body, it is difficult to positively provide a clearance between the conveying-roller-holding member and the apparatus main body, under the influence of the height to which the playback unit is fixed or other reasons, by the amount of rotation of the conveying-roller-holding member. Moreover, though the pressing force of the conveying roller exerted on the disc to be required upon conveying of the disc is provided by the rotating force of the conveying-roller-holding member, there is a problem such that a stable conveying force cannot be obtained because the load of rotating of the member is increased by the abutment of the conveying-roller-holding member against the apparatus main body.

The present invention has been accomplished to solve the above-mentioned problem, and an object of the present invention is to provide a disc apparatus in which a disc can be guided to a conveying roller without being damaged even if the disc is loaded at any angle, moreover, in an initial position, a playback unit is, in a standby condition awaiting the loading of a disc, restrained from a movement to a disc loading port side, and also when a transition occurs from a playback position to a disc unloading position, even if the playback unit has been moved from the initial position to the disc loading port side, the playback unit can be guided automatically to the initial position by the lifting force of the conveying roller.

The disc apparatus according to the present invention loads and unloads a disc into and from an apparatus main body by the rotation of a conveying roller by pressing the disc against a disc guide with the conveying roller, and the disc apparatus includes a playback unit having provided therein the conveying roller and the disc guide vertically movably with respect to the apparatus main body; a moving means for downwardly moving the conveying roller and the disc guide in amounts of travel which are different from each other so as to avoid contact of the conveying roller and the disc guide with the disc with interlocking an operation that the loaded disc is downwardly moved to be mounted on a turntable provided on the playback unit; and a disc-guide-cum-position-regulating member attached to the apparatus main body which corresponds to a disc loading port to restrict a movement of the playback unit to the disc loading port side.

According to the present invention, the disc apparatus is arranged to have the disc-guide-cum-position-regulating member in the apparatus main body corresponding to the disc loading port such that the playback unit is restrained from moving to the disc loading port side. Thus, in a disc-awaiting state/disc loading state where the disc-guide-cum-position-regulating member and the disc guide are positioned at the same horizontal levels, even if the playback unit is subject to movement to the disc loading port side, the playback unit is restrained from moving thereto because the disc guide abuts against the disc-guide-cum-position-regulating member. At that time, a clearance formed between the disc guide and the disc-guide-cum-position-regulating member is small, thus enabling the loaded disc to be prevented from positionally varying.

Further, the disc-guide-cum-position-regulating member is provided with acclivities on the disc loading port side and on the interior side of the apparatus main body, respectively. Thus, when the disc is loaded in the loading port, even if the disc is loaded at any angle, the disc can be guided to the conveying roller. Furthermore, the disc is prevented from contacting the apparatus main body and from being damaged thereby.

Moreover, at a playback state where the disc guide is moved lower than the disc-guide-cum-position-regulating member and is supported freely from the apparatus main body by an elastic support member, even if the playback unit has moved to the disc loading port side because of undergoing of vibrations and the like from a vehicle, the disc guide moves along the acclivity of the disc-guide-cum-position-regulating member by the rising force of the conveying roller, thus enabling the playback unit to be guided automatically to the initial position. Further, in the initial position, the disc-guide-cum-position-regulating member and the disc guide are positioned at the same horizontal level, and as discussed above, the playback unit 1 can be restrained from moving to the disc loading port side.

BEST MODE FOR CARRYING OUT THE INVENTION

Embodiments of the present invention will now be described with reference to the accompanying drawings in order to explain the present invention in more detail.

First Embodiment

Figure 1:
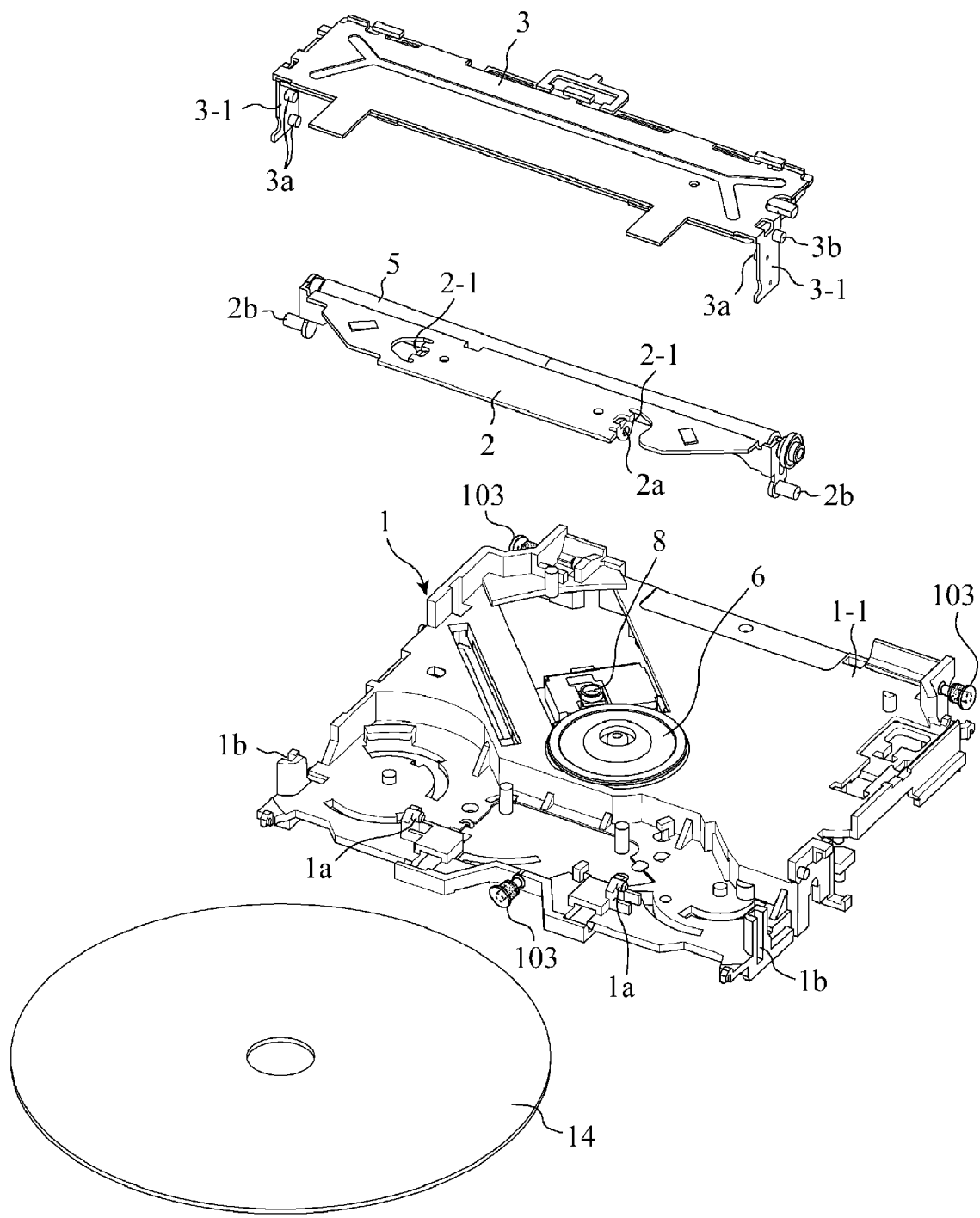
FIG. 1 is an exploded perspective view of a disc playback apparatus in accordance with the first embodiment of the present invention.
Figure 2:
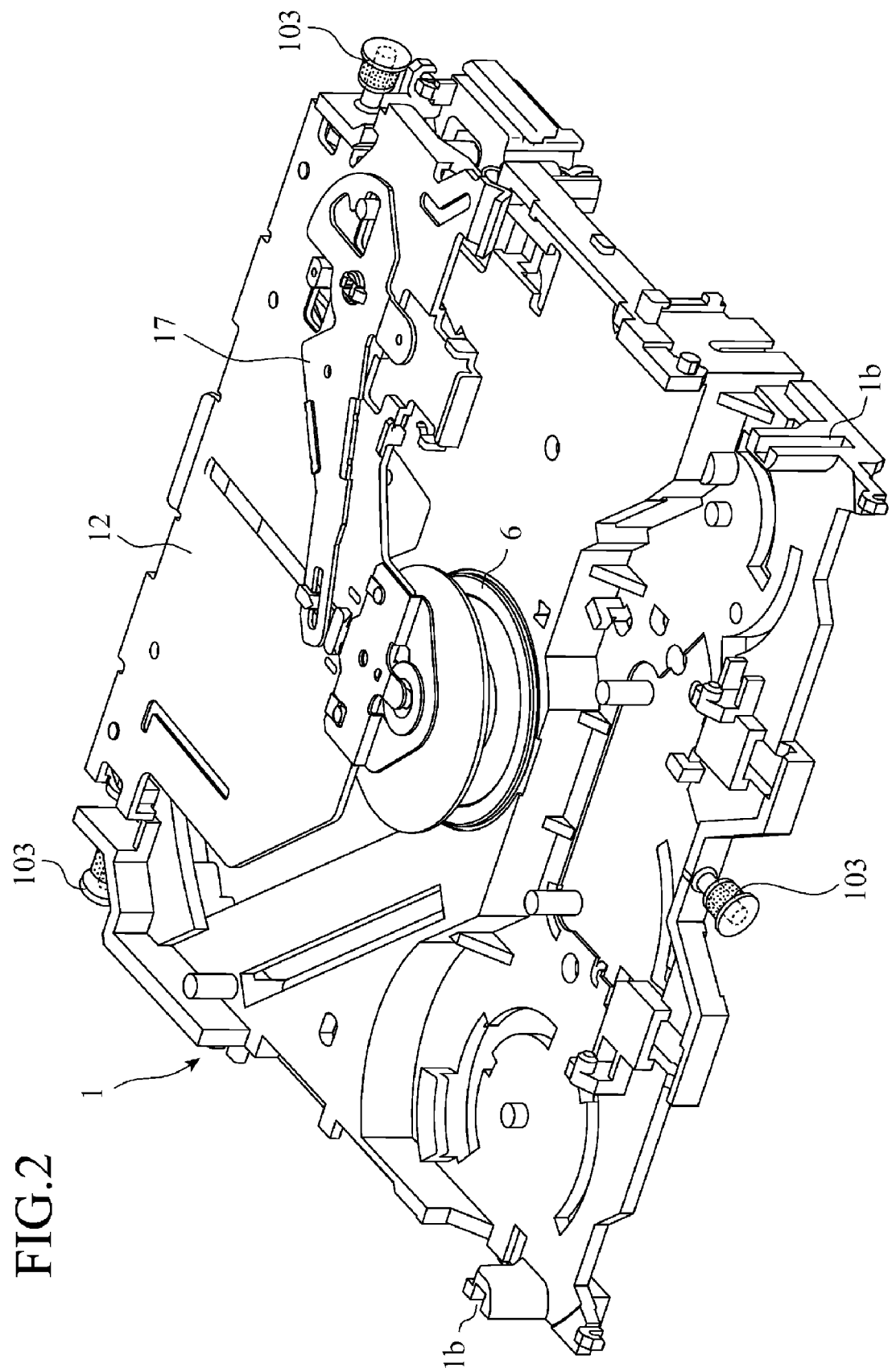
FIG. 2 is a perspective view showing a playback unit.
Figure 3:
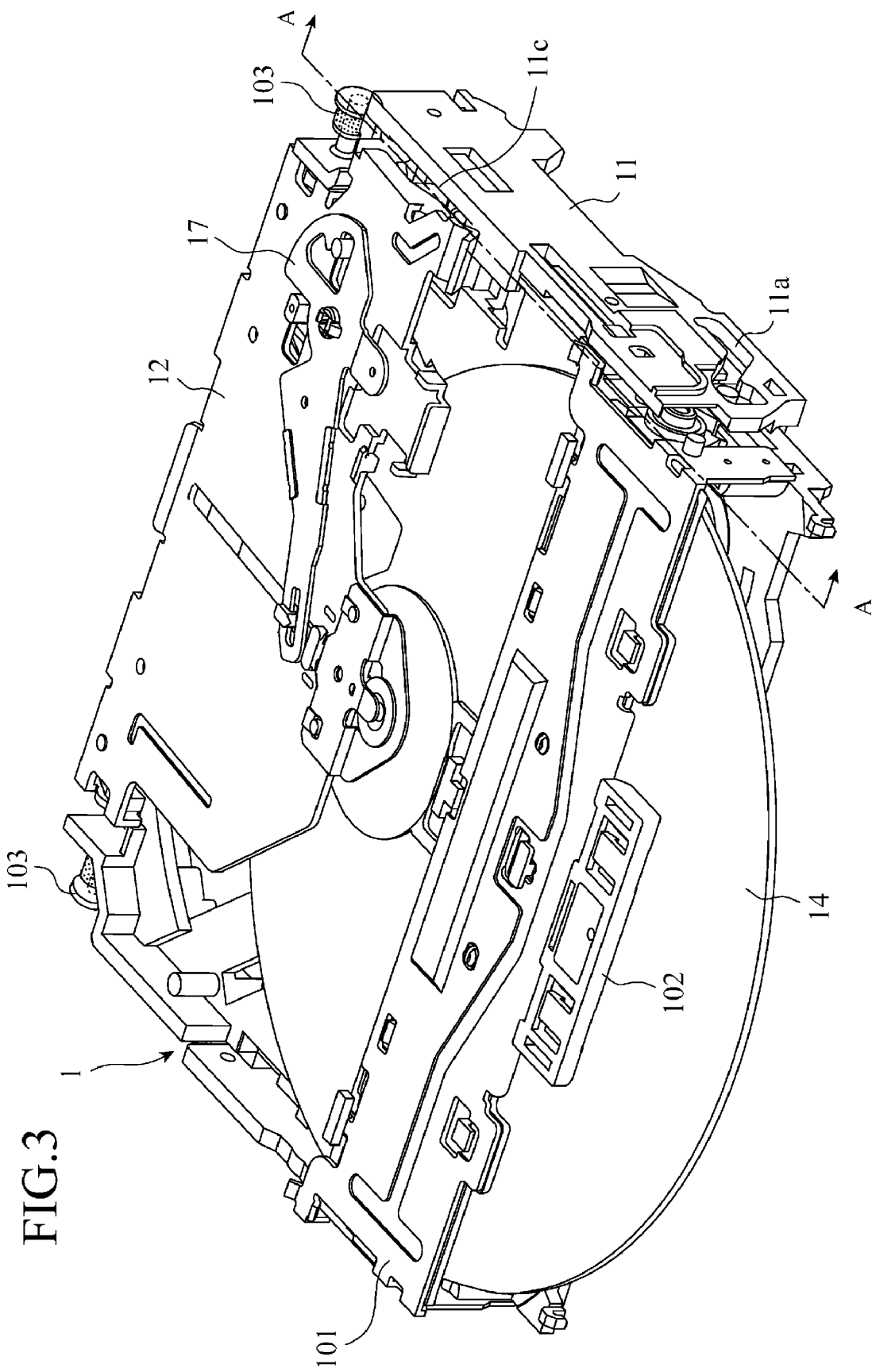
FIG. 3 is a perspective view showing a loading state of a disc to the playback unit.
Figure 4:
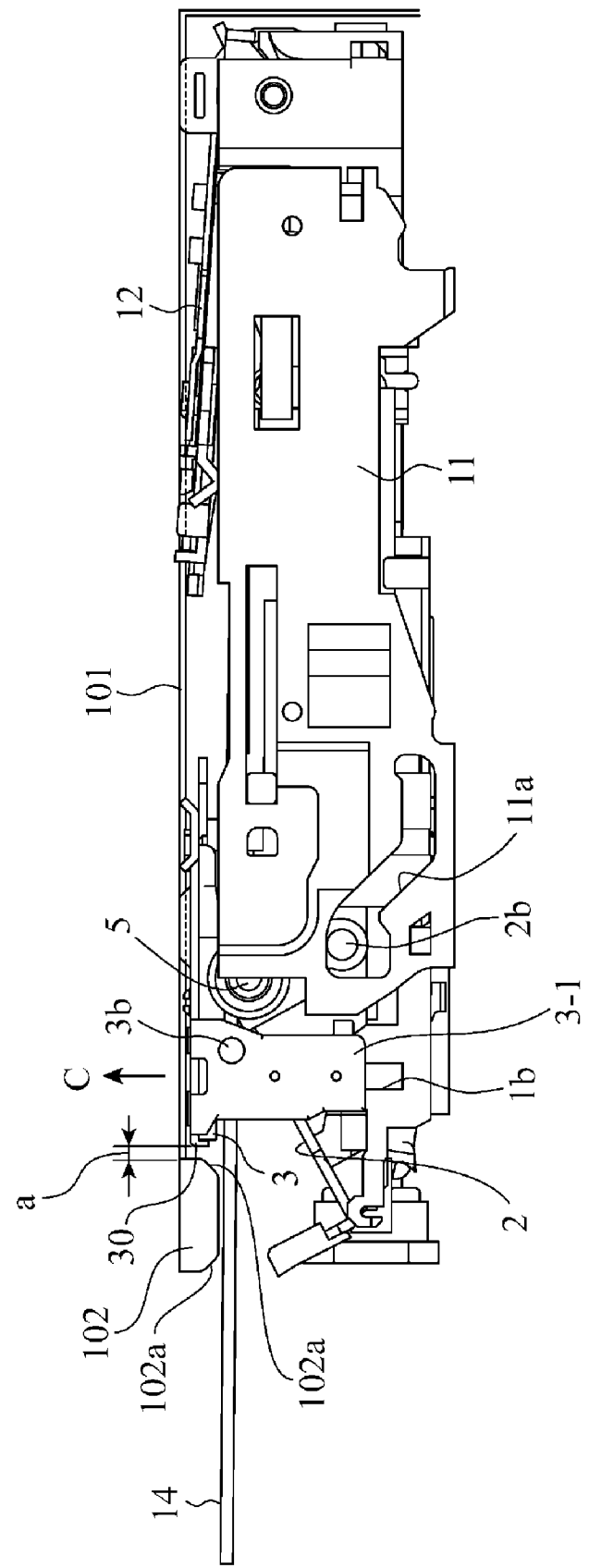
FIG. 4 is a side view of FIG. 3.
Figure 5:
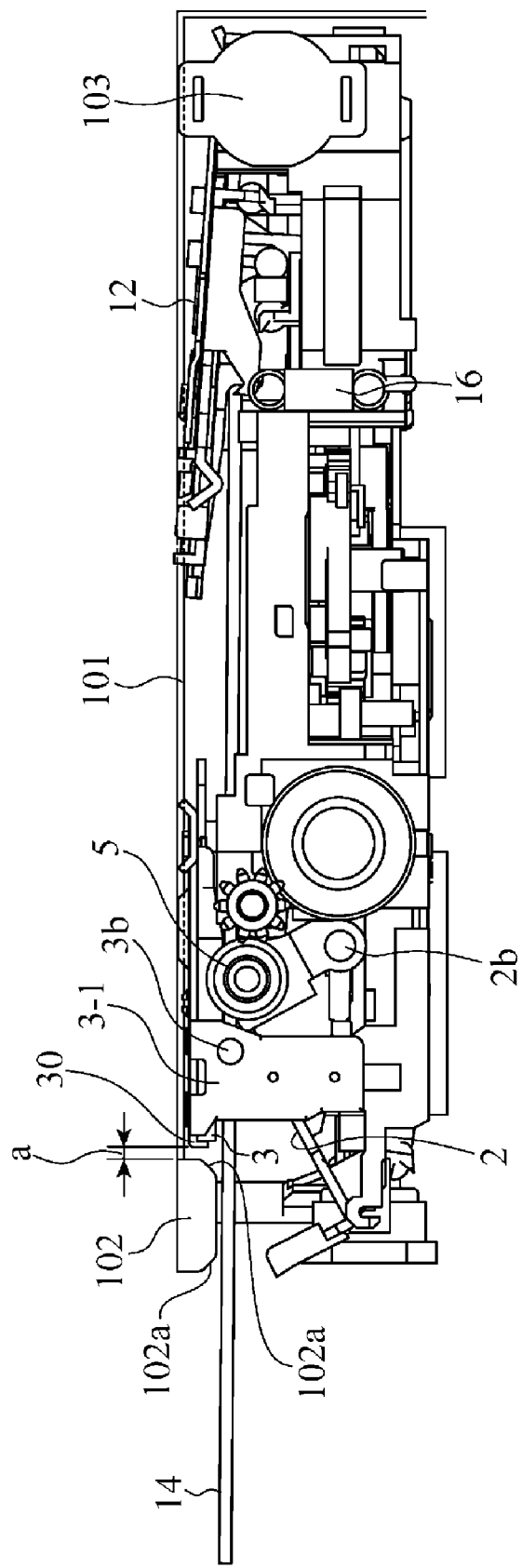
FIG. 5 is a side view showing the playback unit having a slide board removed from the unit in FIG. 4.
Figure 6:
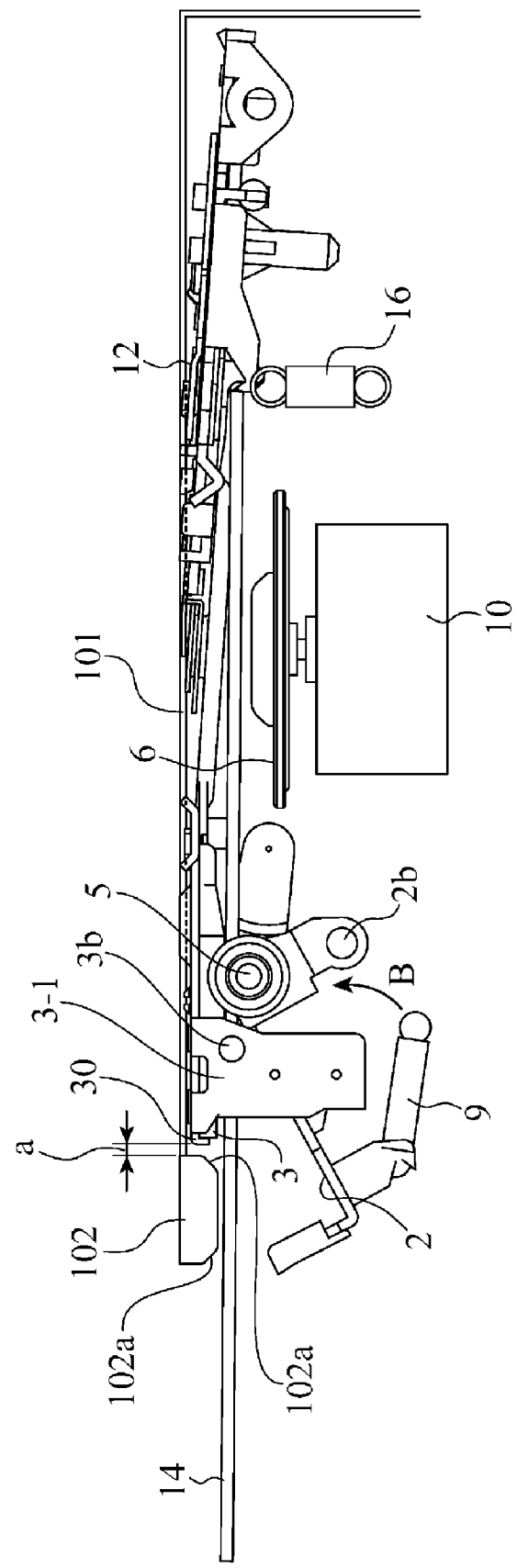
FIG. 6 is a side view showing only the main parts of the playback unit shown in FIG. 4.
Figure 7:
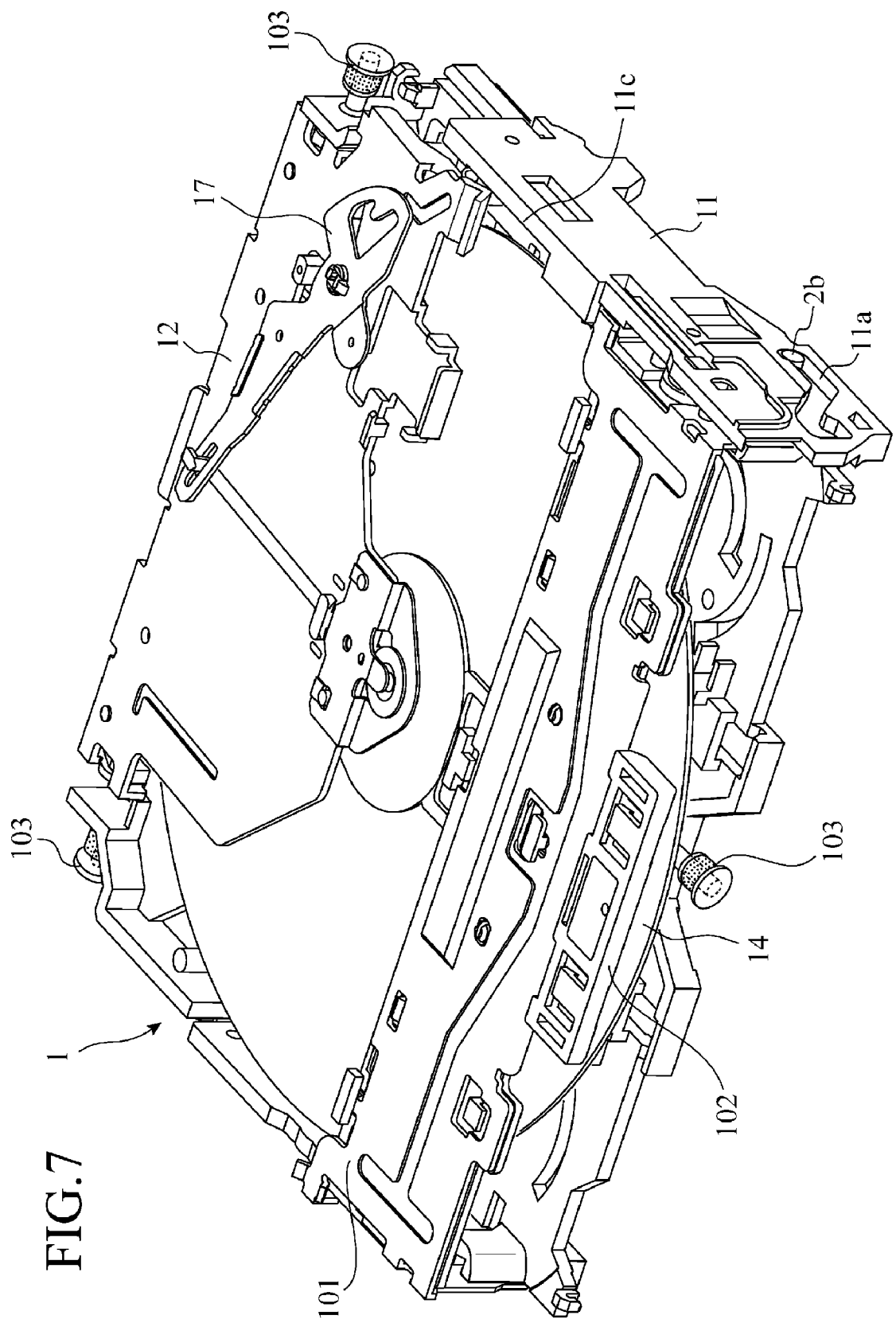
FIG. 7 is a perspective view showing the playback unit having completed the loading of a disc.
Figure 8:
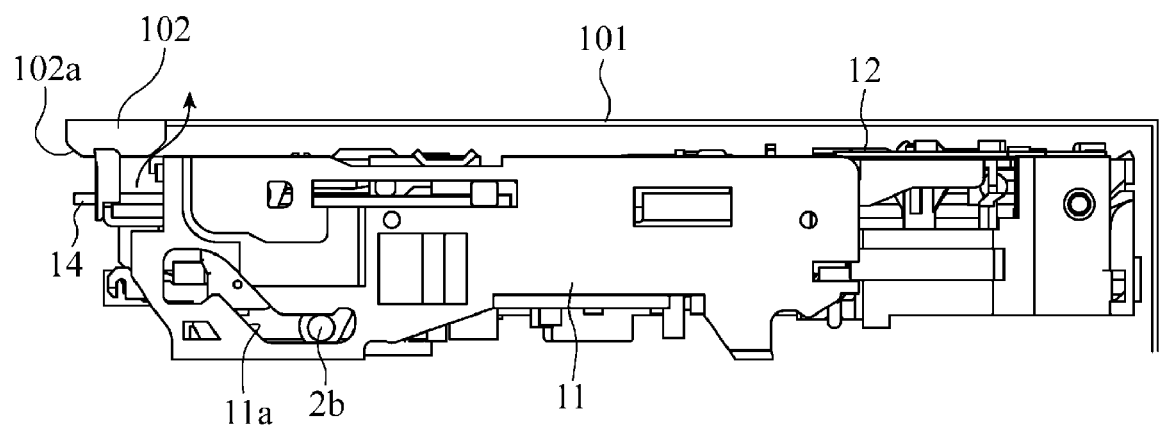
FIG. 8 is a side view of FIG. 7.
Figure 9:
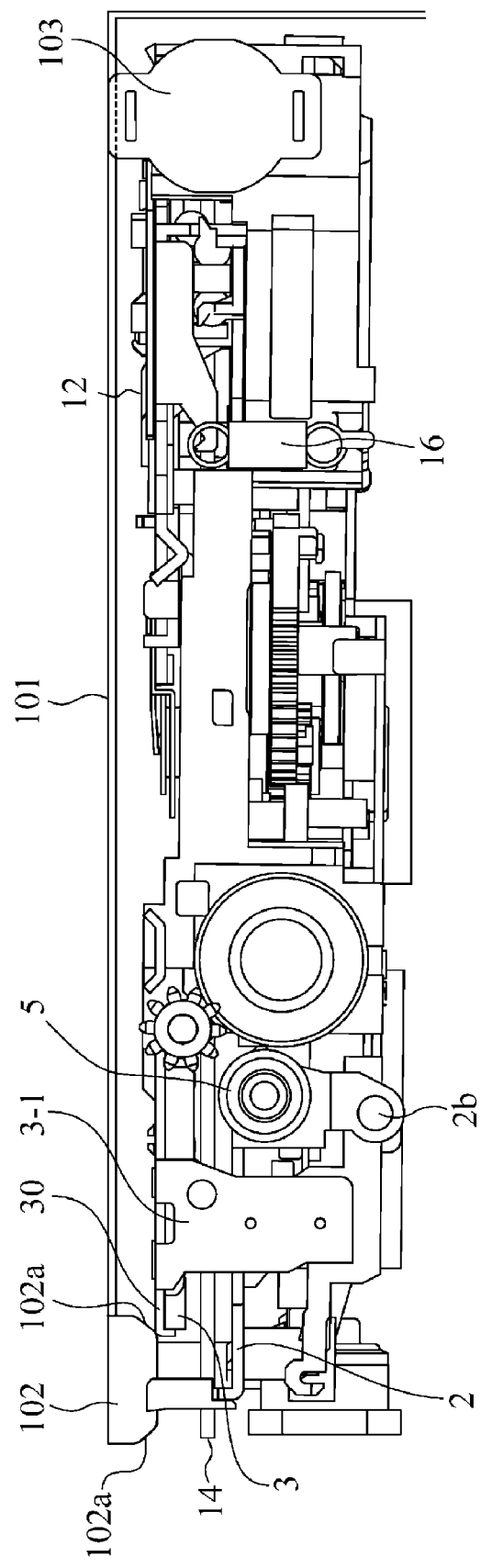
FIG. 9 is a side view showing the playback unit having a slide board removed from the unit in FIG. 7.
Figure 10:
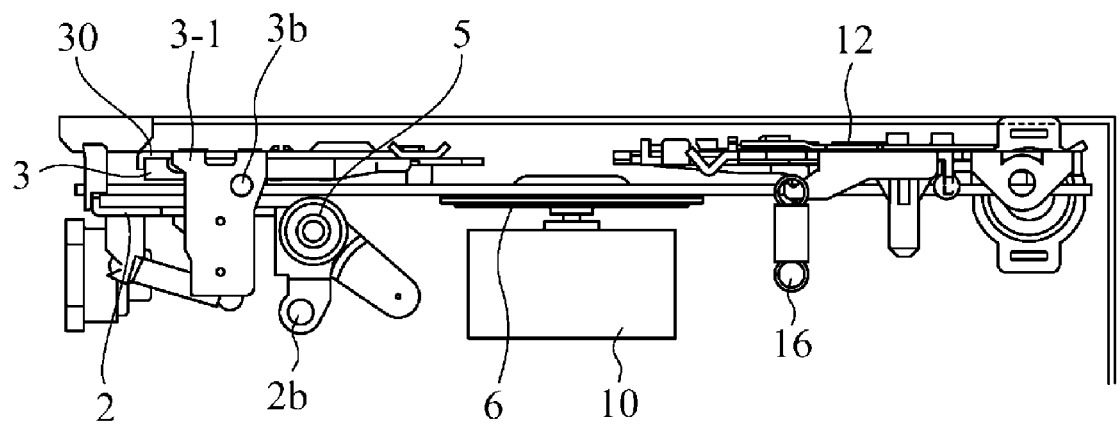
FIG. 10 is a side view showing only the main parts of the playback unit shown in FIG. 7.
Figure 11:
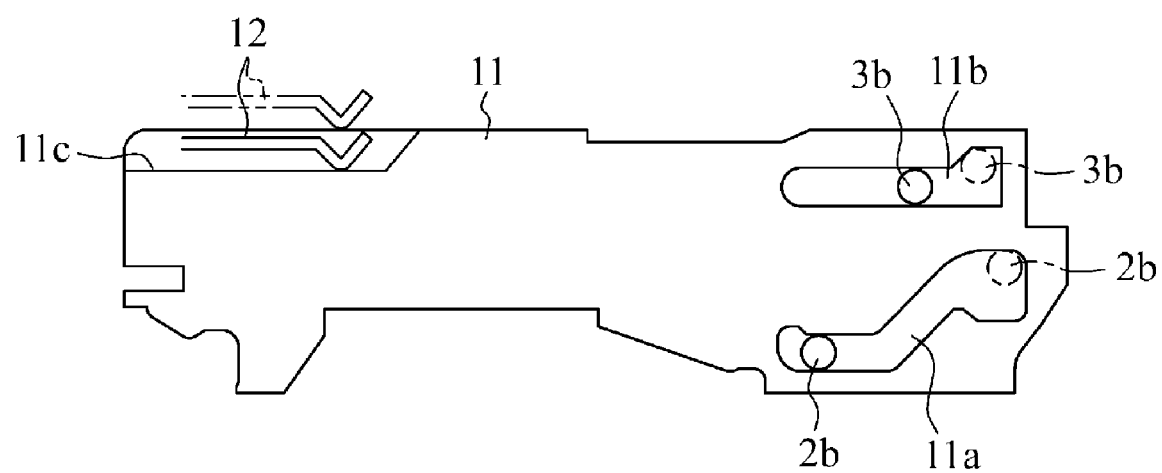
FIG. 11 is a front view showing the slide board viewed from the inside of the apparatus along the line A-A of FIG. 3.

FIG. 1 is an exploded perspective view of a disc playback apparatus in accordance with the first embodiment of the present invention, FIG. 2 is a perspective view showing a playback unit, FIG. 3 is a perspective view showing a loading state of a disc to the playback unit, FIG. 4 is a plan view of FIG. 3, FIG. 5 is a side view showing the playback unit having a slide board removed from the unit in FIG. 4, FIG. 6 is a side view showing only the main parts of the playback unit shown in FIG. 4, FIG. 7 is a perspective view showing the playback unit having completed the loading of a disc, FIG. 8 is a side view of FIG. 7, FIG. 9 is a side view showing the playback unit having a slide board removed from the unit in FIG. 7, FIG. 10 is a side view showing only the main parts of the playback unit shown in FIG. 7, and FIG. 11 is a front view showing the slide board viewed from the inside of the apparatus along the line A-A of FIG. 3.

In the drawings, as shown in FIG. 3, a disc-guide-cum-position-regulating member 102 corresponding to a substantially central portion of a disc loading port is provided on a top face board 101 of an apparatus main body. The disc-guide-cum-position-regulating member 102 has acclivities 102a, 102a on the disc loading port side and on the interior side of the apparatus main body, respectively.

A roller (disc conveying roller) 5 is rotatably journaled at both ends by a roller support member 2, and is urged by a spring 9 (see FIG. 6) so as to be pressed into contact with the backside of a disc guide 3. The roller support member 2 is rotatably fixed to a playback unit 1 by inserting right and left support shafts 1a, 1a provided on the playback unit 1 in mounting apertures (shown in a partially cutaway portion of FIG. 1) 2a, 2a formed through a pair of right and left turned-out (cut-raised) lugs 2-1, 2-1, respectively, formed by turning-out a portion of a plate-shaped member of the roller support member to the back side thereof. Further, the roller support member 2 includes, on the right and left sides thereof, pins 2b, 2b each fitting along a conveying roller traveling cam groove 11a (see FIG. 11) of a slide board 11 provided on each side of the playback unit 1.

The disc guide 3 includes downward guide lugs 3-1, 3-1 on both the right and left sides thereof, and is vertically movably fixed to the playback unit 1 by inserting pins 3a, 3a provided on the inner faces of the guide lugs 3-1, 3-1 in grooves 1b, 1b extending in an upstanding direction and provided on both the right and left sides of the playback unit 1, respectively. Moreover, the downward guide lugs 3-1, 3-1 each have provided on the outer face thereof a pin 3b (the left pin is not shown) fitting along a disc guide traveling cam groove 11b (see FIG. 11) of the slide board 11 (see FIG. 3). A turntable 6 for fixing a disc 14 at the center thereof, a spindle motor 10 (see FIG. 6) for rotating and driving the turntable 6, and an optical pickup 8 for reading signals recorded on the disc 14 are provided in the internal central section of the playback unit 1. It is noted that the disc guide 3 is held by a holding plate 30.

The slide board 11 is provided movably back and forth on each side of the playback unit 1 as shown in FIG. 3 (FIG. 3 shows only one side), and the conveying roller traveling cam groove 11a and the disc guide traveling cam groove 11b are provided on the inner face of the forward portion thereof as shown in FIG. 11. Furthermore, a vacancy section 11c for releasing restraints on a clamp member 12 is provided on the top face of the backward portion of the slide board, and when the vacancy section 11c comes to a position corresponding to the clamp member 12, the clamp member 12 rotates onto the turntable 6 by the urging force of an urging member 16 to press the disc 14 against the turntable 6, thus clamping the disc thereon.

Here, a moving means for downwardly moving the conveying roller 5 and the disc guide 3 in respective amounts of travel which are different from each other is constituted by the slide boards 11, 11, the disc guide travelling cam grooves 11b, 11b and the conveying roller travelling cam grooves 11a, 11a, which are formed on the slide boards 11, 11, the pins 3b, 3b, which are provided on the disc guide 3 and act on the disc guide travelling cam grooves 11b, 11b and the pins 2b, 2b, which are provided on the roller support member 2 and act on the conveying roller travelling cam grooves 11a, 11a.

Next, an operation thereof will be described.

In a standby condition awaiting the loading of a disc 14 and a loaded disc conveying condition, the playback unit 1 is fixed in a vertical and horizontal directions and restrained from backwardly moving by the slide board 11 provided movably back and forth on each side of the apparatus main body. However, the playback unit 1 cannot be restrained from moving to the disc loading side, namely forward of the unit 1.

On the other hand, the roller support member 2, as shown in FIG. 3 to FIG. 6, is rotated and urged in the direction indicated by arrow B (see FIG. 6) with a support shaft 1a (see FIG. 1) as a fulcrum by the spring 9, and the conveying roller 5 is thereby urged to the back side of the disc guide 3. Further, the disc guide 3 is lifted by the conveying roller 5, and is moved upward (in the direction indicated by arrow C) along the groove 1b (see FIG. 1) to be located thereat. When a disc 14 is loaded under such a condition, a detection member (not shown) having detected the loading thereof closes a switch of a motor circuit (not shown), the motor 10 thereby rotates the conveying roller 5 by the driving force thereof, and the disc 14 is nipped between the conveying roller 5 and the disc guide 3 to be carried to the interior of the apparatus by the roller. In the standby condition awaiting the loading of a disk and in the loaded disc conveying condition, even if the playback unit 1 is subject to movement to the disc loading port side by vibrations of a vehicle, the disc guide 3 abuts against the discguide-cum-position-regulating member 102 at the front end face thereof to restrain the playback unit from moving.

When the central portion of the disc 14 comes to the top of the turntable 6 as shown in FIG. 7, the slide board 11 slides and moves to the front face side of the apparatus main body in association with the movement of a lever 17 (see FIG. 2 and FIG. 3) which is pressed and moved by the loaded disc. As the slide board 11 moves, the playback unit 1 is released from fixations in the vertical and horizontal directions, and restrictions on backward movements to be supported by an elastic support member 103 in a vibration-proofing manner in the apparatus main body.

At that time, as the slide board 11 moves, the clamp member 12 that has been restrained from downwardly rotating on the top face of the slide board 11 associates with the vacancy section 11c located on the top face of the slide board 11 to thereby be released from the restraint, and rotates downward by the urging force of the urging member 16 to press the disc 14 against the top of the turntable 6 and hold the disc thereon as shown in FIG. 8 to FIG. 10. Further, the roller support member 2 undergoes a rotation force by the conveying roller travelling cam groove 11a to be lowered, and also the disc guide 3 undergoes a rotation force by the disc guide travelling cam groove 11b to be lowered in an amount of movement, which is different from that of the roller support member 2, and simultaneously be moved in the horizontal direction by a clearance between the pin 3a and the groove 1b.

In this case, the conveying roller 5 and the disc guide 3 are downwardly moved in respective amounts of movement which are different from each other because of the difference in form between the conveying roller travelling cam groove 11a and the disc guide travelling cam groove 11b. As a result, there are formed respective clearances between the top face board 101 of the apparatus main body and the disc guide 3, between the disc guide 3 and the disc 14, and between the disc 14 and the conveying roller 5, while there is provided a vibration isolation between the top face board 101 of the apparatus main body and the disc guide 3. Moreover, in the gaps between the disc guide 3 and the disc 14, and between the disc 14 and the conveying roller 5, the disc 14 during playback is prevented from contacting the disc guide 3 and the conveying roller 5.

As discussed above, in accordance with the first embodiment, the disc apparatus is arranged to have the disc-guide-cum-position-regulating member 102 at the apparatus main body corresponding to the disc loading port such that the playback unit 1 is restrained from moving to the disc loading port side. Thus, in a standby state awaiting the loading of a disc and a disc loading state where the disc-guide-cum-position-regulating member 102 and the disc guide 3 are positioned at the same horizontal levels, even if the playback unit 1 is subjected to a movement to the disc loading port side, the playback unit is restrained from moving thereto because the disc guide 3 abuts against the disc-guide-cum-position-regulating member 102. At that time, a clearance "a" formed between the disc guide 3 and the disc-guide-cum-position-regulating member 102 is small, thus enabling to suppress positional variations of the loaded disc 14.

Furthermore, it is configured that the acclivities 102a, 102a are provided on the disc loading port side and on the interior side of the apparatus main body of the disc-guide-cum-position-regulating member 102, respectively. Thus, when the disc 14 is loaded on the loading port, even if the disc is loaded at any angle, the disc 14 can be guided to the conveying roller 5, and thereby prevented from contacting the apparatus main body. As a result, the disc 14 is not scratched during the loading.

Further, at a playback state where the disc guide 3 is moved downward from the disc-guide-cum-position-regulating member 102 and is freely supported by the elastic support member 103 in the apparatus main body, even if the playback unit 1 is moved to the disc loading port side by undergoing vibrations or the like from a vehicle, the disc guide 3, when the playback unit 1 is subjected to the lifting force of the conveying roller 5 to be moved from the playback position to the disc unloading position, moves along the acclivities 102a, 102a of the disc-guide-cum-position-regulating member 102, thus enabling the playback unit to be guided automatically to the initial position. Moreover, the disc-guide-cum-position-regulating member 102 and the disc guide 3 are positioned at the same horizontal level, and as discussed above, the playback unit 1 can be restrained from moving to the disc loading port side.

INDUSTRIAL APPLICABILITY

As discussed above, the disc apparatus according to the present invention is arranged such that a disc can be guided to a conveying roller without being damaged even if the disc is loaded at any angle. Moreover, the disc apparatus is arranged to have the disc-guide-cum-position-regulating member provided on the apparatus main body corresponding to the substantial central portion of the disc loading port side such that, in an initial position, the playback unit is, in a standby state awaiting the loading of a disc, restrained from a movement to the disc loading port side, and also when a transition occurs from the playback position to the disc unloading position, even if the playback unit has been moved from the initial position to the disc loading port side, the playback unit can be guided automatically to the initial position by the lifting force of the conveying roller. Thus, the disc apparatus is suitable for use, e.g., in a disc apparatus which loads and unloads a disc into and from an apparatus main body by the rotation of a conveying roller by pressing the disc against a disc guide by means of the conveying roller.

The invention claimed is :

1. A disc apparatus which loads and unloads a disc into and from an apparatus main body by the rotation of a conveying roller by pressing the disc against a disc guide by means of the conveying roller, said apparatus comprising:
   a playback unit provided with the conveying roller and the disc guide to be vertically movable with respect to the apparatus main body;
   a moving means for moving downward the conveying roller and the disc guide in amounts of travel which are different from each other to avoid contact of the conveying roller and the disc guide with the disc with interlocking an operation that the loaded disc is moved downward to be mounted on a turntable provided on the playback unit; and
   a disc-guide-cum-position-regulating member attached to the apparatus main body which corresponds to a disc loading port to restrict a movement of the playback unit to the disc loading port side.

2. The disc apparatus according to claim 1, wherein the disc-guide-cum-position-regulating member is provided with acclivities on the disc loading port side and on the interior side of the apparatus main body, respectively.

* * * * *